（12） United States Patent
Hernandez et al.

(10) Patent No.: US 8,311,827 B2
(45) Date of Patent: Nov. 13, 2012

(54) VEHICLE CONTROL

(75) Inventors: Ruben San-Segundo Hernandez, Madrid (ES); David Scarlatti, Madrid (ES); Roberto Molina, Madrid (ES); Javier Ferreiros Lopez, Madrid (ES); Victor Perez Villar, Madrid (ES)

(73) Assignee: The Boeing Company, Chicago, IL (US)

( * ) Notice: Subject to any disclaimer, the term of this patent is extended or adjusted under 35 U.S.C. 154(b) by 977 days.

(21) Appl. No.: 12/233,890

(22) Filed: Sep. 19, 2008

(65) Prior Publication Data

US 2009/0083034 A1    Mar. 26, 2009

(30) Foreign Application Priority Data

Sep. 21, 2007    (EP) ..................................... 07380260

(51) Int. Cl.
*G10L 15/04* (2006.01)
*G10L 21/00* (2006.01)
(52) U.S. Cl. ........................................ 704/251; 704/275
(58) Field of Classification Search .................. 704/200, 704/207, 211, 251, 270, 275
See application file for complete search history.

(56) References Cited

U.S. PATENT DOCUMENTS

| | | | |
|---|---|---|---|
| 5,666,400 A * | 9/1997 | McAllister et al. | 379/88.01 |
| 6,128,594 A | 10/2000 | Gulli et al. | |
| 6,839,670 B1 * | 1/2005 | Stammler et al. | 704/251 |
| 2003/0110028 A1 | 6/2003 | Bush | |
| 2005/0055209 A1 * | 3/2005 | Epstein et al. | 704/255 |

OTHER PUBLICATIONS

The Boeing Company, partial European Patent Search, Application No. 07380260.5-1224, dated Mar. 20, 2008.
Modeling Improvement of the Continuous Hidden Markov Model for Speech Recognition by Zhi-Ping Hu and Satoshi Imai, Digital Signal Processing 2, Estimation, VLSI, San Francisco, Mar. 23, 1992. ISBN: 0-7803-0532-9.
Craparo et al; "Natural Language Processing in the Control of Unmanned Aerial Vehicles"; Massachusetts Institute of Technology; American Institute of Aeronautics and Astronautics, Inc. 2004.
Dalton, John P.; "Speech Technologies: Ready for Prime Time"; Forrester Research, Inc. Apr. 2003.
Paskin, Mark A.; "Grammatical Bigrams"; Neural Information Processing Systems Foundation, 2001.

* cited by examiner

*Primary Examiner* — Angela A Armstrong
(74) *Attorney, Agent, or Firm* — Klintworth & Rozenblat IP LLC (57) ABSTRACT

The present invention relates to voice-activated vehicle control, and to the control of UAVs (unmanned air vehicles) using speech in particular. A method of controlling a vehicle is provided that includes receiving one or more instructions issued as speech and analyzing the speech using speech recognition software to provide a sequence of words and a word confidence measure for each word so recognized. The sequence of words is analyzed to identify a semantic concept corresponding to an instruction based on the analysis, and a semantic confidence level for the semantic concept identified derived at least in part with reference to the word confidence measures of the words associated with the semantic concept. A spoken confirmation of the semantic concept so identified based on the semantic confidence level is provided, and the semantic concept is used to provide a control input for the vehicle.

25 Claims, 3 Drawing Sheets

VEHICLE CONTROL

CROSS REFERENCE TO RELATED APPLICATION

This application claims priority to European Patent Application Serial Number 07380260.5, filed on Sep. 21, 2007, titled Vehicle Control.

FIELD

The present disclosure relates to voice-activated vehicle control, and to the control of UAVs (unmanned air vehicles) using speech in particular.

BACKGROUND

Nowadays speech technology has reached a high level of performance and this has led to its increasing use in many critical systems. Research performed by aeronautical companies and regulatory institutions in collaboration with speech technology expert groups has seen the development of large speech and text databases, along with new speech and text processing models that are adapted to specific field requirements. An important area of critical application that may benefit from these capabilities is the control of aerial vehicles. Air Traffic Control (ATC) and interfaces for UAVs benefit in particular. UAVs are of particular interest to the present invention.

When developing a UAV control interface, it is usual to include the following speech recognition modules: a speech recognizer for converting natural speech into a sequence of words, a natural language understanding module that extracts the main semantic concepts from the text (the commands to be executed and their corresponding data for UAV control), and a response generation module for creating a natural response to the pilot that will be converted into speech by a speech synthesiser. The response confirms the command received.

Speech recognition software that has been developed so far is based on two sources of knowledge, acoustic modelling and language modelling. Related to the acoustic modelling, current speech recognition systems are based on hidden Markov models (HMMs). For each allophone (a characteristic pronunciation of a phoneme), one HMM model is calculated as a result of a training process carried out using a speech database. A speech database consists of several hours of transcribed speech (composed of files with speech and text combined, where it is possible to correlate the speech signal to the words pronounced by the person). The size of the database determines the versatility and robustness of the speech recognition. Database acquisition is a very costly process because it requires linguistics experts for transcribing by hand the speech pronounced by different speakers.

The language modelling complements the acoustic modelling with the information about the most probable word sequences. There are several techniques for language modelling including grammar-based language modelling and statistical language modelling (N-gram).

Grammar-based language modelling consists of defining all possible sentences that the system can recognise. Any other word sequence, not foreseen in these sentences, is rejected. This model is easier to generate by a non-expert, but it is very strict and does not deal well with the spontaneous or stressed speech found in real-life situations.

Statistical language modelling consists of computing the probability of a word, given the N−1 previous words. For example, a 3-gram model consists of the probabilities of each possible word preceded by any combination of two words. The statistical model is generated automatically from some application-oriented text (set of sentences), considering a smoothing process for non-seen sequences. This smoothing means that all word sequences are permitted to some extent (there are no forbidden word sequences), fulfilling the roll of a fundamental robustness factor. This fact is very important when modelling spontaneous speech as it accommodates word repetitions, doubts, etc.

So far, all speech recognition systems incorporated in UAV interfaces are commercial programs such as those provided by Microsoft™ and Nuance™. These recognisers are integrated by the UAV interface developer, typically an expert on UAV task assignment and piloting but not necessarily a speech technology expert. Although speech recognition systems are evolving to more robust and user-friendly software engines, there are still important limitations in their configuration that affect drastically the speech recognition performance. One important aspect is the language modelling: the commercial recognition engines offer the possibility to define a grammar-based model (easy to define by a non-expert), but this configuration is not flexible enough for spontaneous or stressed speech that often appears in UAV control interfaces.

To understand spoken commands, one must extract the semantic information or "meaning" (inside the specific application domain) from the speech recogniser output (i.e. the sequence of words it provides). The semantic information may be represented by means of a frame containing some semantic concepts. A semantic concept consists of an identifier or attribute, and a value. For example, a concept could be "WAYPOINT_CODE" while the value is "A01". Usually, the natural language understanding is performed by rule-based techniques. The relations between semantic concepts and sequences of words or other concepts are defined by hand by an expert. The rule-based techniques can be classified into two types, top-down and bottom-up strategies.

In a top-down strategy, the rules look for semantic concepts from a global analysis of the whole sentence. This strategy tries to match all the words in the sentence to a sequence of semantic concepts. This technique is not flexible and robust enough to deal with error in the word sequence provided by the speech recogniser. Even a single error may cause the semantic analysis to fail. Most previous attempts at speech interfaces for UAV command and control use rule-based techniques with top-down strategy.

In a bottom-up strategy, the semantic analysis is performed starting from each word individually and extending the analysis to neighbourhood context words or other already built conceptual islands. This extension is performed to find specific combinations of words and/or concepts (blocks) that generate a higher level semantic concept. The rules implemented by the expert define these relations. This strategy is more robust against speech recognition errors and is necessary when a statistical language model is used in the speech recognition software.

The response generation module translates the understood concepts into a natural language sentence used to confirm the command back to the pilot. These sentences can be fixed or can be built using templates with some variable fields. These fields are filled in with the information obtained from the semantic interpretation of the previous sentence. Both kinds of response generation modules have been used in the past for UAV command and control. Finally, the natural language sentence is converted into speech by means of a text-to-speech conversion system using a speech synthesiser.

SUMMARY

Against this background, and from a first aspect, embodiments of the present invention resides in a computer-implemented method of controlling a vehicle comprising: receiving one or more instructions issued as speech; analyzing the speech using speech recognition software to provide a sequence of words and a word confidence measure for each word so recognized; analyzing the sequence of words to identify a semantic concept corresponding to an instruction based on the analysis, and a semantic confidence level for the semantic concept identified derived at least in part with reference to the word confidence measures of the words associated with the semantic concept; providing a spoken confirmation of the semantic concept so identified based on the semantic confidence level; and using the semantic concept so identified to provide a control input for the vehicle.

The use of confidence measures is advantageous in increasing the accuracy of the speech recognition. Moreover, it allows the spoken confirmation to be tailored to the anticipated accuracy of the speech recognition, as expressed through the confidence measures.

Optionally, analyzing the speech to provide a sequence of words comprises using hidden Markov models. Continuous hidden Markov models may be used.

Preferably, analyzing the speech to provide a sequence of words comprises using a language model that provides information about the most likely sequences of words expected to be found. Optionally, the method may comprise using the language model to provide a 2-gram statistical model. Other N-gram statistical models may be used.

Optionally, the method may comprise analyzing both the sequence of words and the associated word confidence levels to identify the one or more semantic concepts.

Preferably, the method comprises analyzing the sequence of words to identify the one or more semantic concepts using a bottom-up approach starting with an analysis of each word identified individually and then extending the analysis to neighbouring words. This is in contrast to the less preferred, top-down approach.

Optionally, the method may comprise analyzing the sequence of words to identify the one or more semantic concepts by tagging each word according to its type, for example command, digit or letter, and looking for known patterns from the sequence of tags, thereby allowing deduction of a semantic concept. For example, a known sequence of digits and letters (say, letter-digit-digit) may correspond to the labelling convention of a particular command (say, waypoint codes are identified in this way).

Of course, there will be situations where the speech recognition process will have difficulty, for example because of background noise or badly-spoken instructions. To aid in the robustness of the system, a threshold may be used to test a semantic concept. The semantic confidence measure may be compared to the threshold, and action taken depending upon whether or not the measure exceeds the threshold. For example, the spoken confirmation of the semantic concept identified may include an indication that the instruction was not understood when the semantic confidence level is below the threshold. The method may comprise using the semantic concept so identified to provide a control input for the vehicle only when the semantic confidence level exceeds a threshold. The threshold may be set in different ways. It may correspond to a constant, set in advance. Alternatively, the threshold may be set by an operator, and adjusted as frequently as is desired. As another alternative, the threshold may be a variable that is calculated as part of a feedback system. For example, the threshold may be varied according to how many of the spoken confirmations lead to a correction on the part of the operator (many corrections would indicate over-confidence and too low a threshold).

Optionally, the method may comprise providing a spoken confirmation of the semantic concept so identified based on the semantic confidence level and also an indicated verbosity level. Preferably, the speaking rate and/or pitch of the spoken confirmation increases as the indicated verbosity level decreases.

Similarly, the method may comprise providing a spoken confirmation of the semantic concept identified based on the semantic confidence level and an urgency level, the verbosity of the spoken confirmation decreasing with increasing urgency level. Preferably, the speaking rate and/or pitch of the spoken confirmation increases as the urgency level increases.

The method may comprise generating the spoken confirmation using response templates. The response templates may contain skeleton responses to which detail may be added: the semantic concept identified will determine the template to use and the detail to be added.

From a second aspect, the present invention resides in apparatus for controlling a vehicle, comprising: an input arranged to receive one or more instructions issued as speech; a memory arranged to store the received speech; a speech recognition module arranged to analyze the speech to provide a sequence of words and a word confidence measure for each word so recognized; a natural language understanding module arranged to receive the sequence of words and the word confidence measures, and analyze the sequence of words to identify a semantic concept corresponding to an instruction based on the analysis, and a semantic confidence level for the semantic concept identified derived at least in part with reference to the word confidence measures of the words associated with the semantic concept; a response generation module arranged to provide a spoken confirmation of the semantic concept so identified based on the semantic confidence level; and a commercial generating module arranged to use the semantic concept so identified to provide a control input for the vehicle. The present invention also resides in a computer program for implementing the above methods, and to a computer program product carrying such a computer program.

Other preferred, but optional, features are defined in the appended claims.

BRIEF DESCRIPTION OF THE DRAWINGS

In order that the present invention may be more readily understood, preferred embodiments will now be described, by way of example only, with reference to the accompanying drawings, in which.

DETAILED DESCRIPTION

Figure 1:
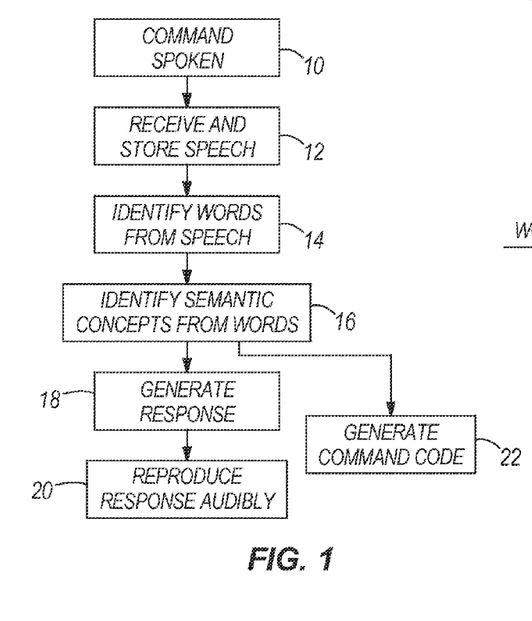
FIG. 1 is a schematic representation of a method of controlling a vehicle using speech recognition.

A general method of controlling a vehicle, such as a UAV, is shown in FIG. 1. At 10, a command is spoken that is received at 12 by a system arranged to implement the method. The system may be, for example, a suitably programmed computer. The system stores the speech it has received at 12.

Speech recognition algorithms are then employed by the system at 14 to identify words from the stored speech. In addition, the system determines a word confidence measure for each word identified.

At 16, the system then identifies semantic concepts from the previously identified words and the word confidence measures at 16. The system also provides a semantic confidence measure for each semantic concept identified.

The system then generates a verbal response at 18, and uses a speech synthesiser at 20 to reproduce audibly the response in spoken form. The response corresponds to a confirmation of the command as understood by the system. It is reproduced audibly such that corrective action may be taken if the command has been misunderstood, or as a prompt for a further input when the system has not been able to understand the command.

In addition, the system uses the semantic concepts identified to generate command code at 22. This command code may be relayed to the vehicle's control system, thereby effecting control of the vehicle.

Figure 2:
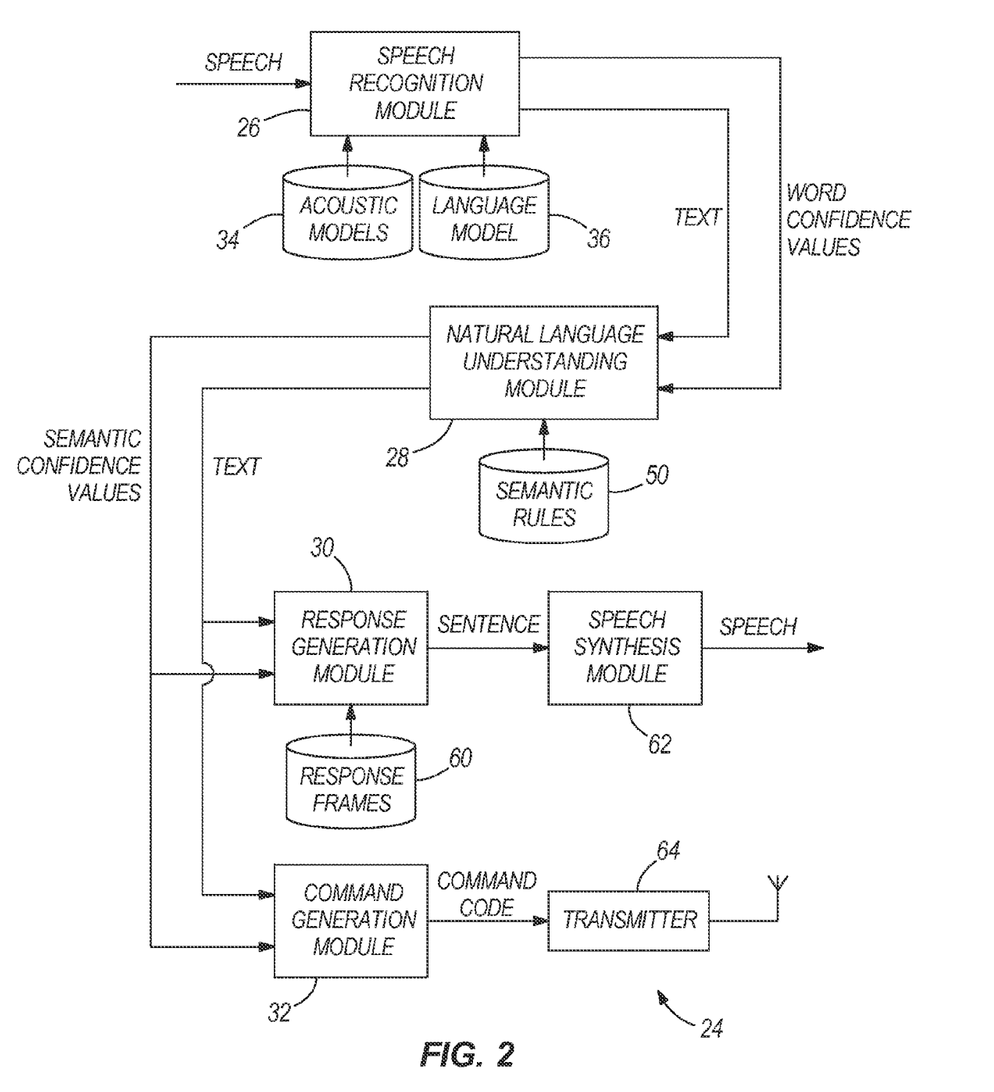
FIG. 2 is a schematic representation of a system for carrying out the method shown in FIG. 1.

FIG. 2 shows functionally a system 24 for implementing the method described above. The system 24 is described in the context of remote control of a UAV using a laptop computer. The laptop computer is suitably programmed, as will be described below. It will be appreciated that this scenario is but one particular embodiment of the invention, and that many other applications are envisaged.

The system comprises a number of modules, arranged as follows.

The speech recognition module 26 converts the natural speech received into a sequence of words (text). One important characteristic of this module 26 is the statistical language model that has been trained for increasing the robustness against spontaneous speech. Another important characteristic is the confidence estimation: every recognized word is tagged with a word confidence value representing the belief of the speech recognition module 26 on the goodness of its own work. Confidence values between 0.0 (lowest confidence) and 1.0 (highest confidence) are used. The word confidence values correspond to the reliability of the word sequence obtained from the speech recognition module 26.

The natural language understanding module 28 extracts the main semantic concepts (commands and their corresponding data) from the text, using semantic rules defined by an expert. This module 28 also generates a confidence estimation for every semantic concept extracted.

The response generation module 30 uses several response templates to create a natural language sentence as confirmation of the command understood. The response templates used are variable and they depend on the semantic concept confidence values, on the urgency status, and on the confirmation verbosity desired. The sentence is passed to a speech synthesiser module 62, where it is reproduced as speech.

The command generation unit 32 uses the text provided by the natural language understanding module 28 to derive command code. This command code is passed to the UAV and is used by the UAV's flight management system and hence determines aspects of the UAV's flight.

A more detailed description of the system of FIG. 2 now follows.

The speech recognition module 26 is a state of art speech recognition system that uses HMMs (Hidden Markov Models) with the following main characteristics.

A continuous speech recognition system is used that recognises utterances formed by several words continuously spoken. In this embodiment, the vocabulary size is ninety-three words.

The speech recognition module 26 has speaker independency. It has been trained with a large database, making it robust against a great range of potential speakers without further training by actual users.

Also, the speech recognition module 26 can generate one optimal word sequence (given the acoustic and language models), a solution expressed as a directed acyclic graph of words that may compile different alternatives, or even the N-best word sequences sorted by similarity to the spoken utterance.

A confidence measure for each word recognized in the word sequence is also provided by the speech recognition module 26, with values between 0.0 and 1.6. This measure is important because the speech recognition module 26 performance can vary depending on several aspects including level of noise in the environment, non-native speakers, more or less spontaneous speech, or the acoustic similarity between different words contained in the vocabulary. Nowadays, commercial speech recognition engines do not provide this characteristic because it is difficult to manage when designing a speech interface for critical applications The speech recognition module 26 refers to an acoustic models database 34 that stores 3,500 triphone HMMs for modelling all possible allophones and their context. The acoustic models database 34 also has sixteen silence and noise HMMs for detecting acoustic effects (non-speech events like background noise, speaker artefacts, filled pauses, . . . ) that appear in spontaneous speech. It is important to detect and process them in order to avoid these noises affecting the recognition performance.

In this embodiment, the speech recognition module 26 uses continuous HMMs. This means that the probability density functions used in every state of each model are continuous functions (multi-Gaussian). This modelling has been shown to be the most powerful strategy for implementing HMMs. The acoustic HMMs have been trained with a very large database, containing more than twenty hours of speech from 4,000 speakers. The size of the database 34 and the variability of the speakers provide the acoustic models 34 with an important recognition power and robustness.

The speech recognition module 26 also refers to a database 36 storing a language model. The language model complements the acoustic models with information about the most probable sequences of words. In this embodiment, the language model 36 uses a 2-gram statistical language modelling. This type of model computes the probabilities of a word preceded by another word. As noted above, this kind of language modelling has the best robustness when modelling spontaneous speech (word repetitions, doubts, . . . ), because it does not exclude any word sequence. On the other hand, it needs a more complicated configuration of the automatic tools for language model generation, requiring expert intervention.

Figure 3:
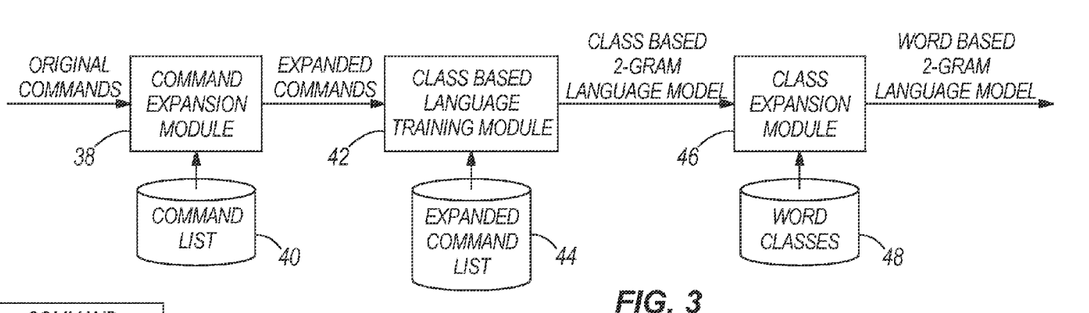
FIG. 3 is a schematic representation of a method of training the language model of FIG. 2.

FIG. 3 shows the method employed to train a word based 2-gram language model from the original commands description provided by UAV control experts. This method consists of three steps.

The method begins when original commands are received. As the first step in the command expansion, the command expansion module 38 expands every command description with reference to a command list database 40 and by considering its defined structure. Some examples of expansion are the following.

For optional parts, the command is expanded considering all possible structures. For example, ASCEND [AND HOLD] {$HEIGHT} is expanded as "ASCEND {$HEIGHT}" and "ASCEND AND HOLD {$HEIGHT}" (the words between catches vary according to what has been specified).

For a list of elements, when a list of possible values is defined, copies of the same command are generated choosing one value for each instance. For example, "(SHORT|MEDIUM|LARGE) RADIUS", gives three examples with different values are generated (the list elements are expressed between parenthesis and separated by vertical lines).

For a macro expansion, every macro is expanded reproducing its structure. For example {$HEIGHT} can be expanded to several structures:

"{$DIGIT} {$DIGIT} {$DIGIT} {$DIGIT} FEET" or "FLIGHT LEVEL {$DIGIT} {$DIGIT} {$DIGIT}", where "{$DIGIT}" is another macro containing the words for the basic digits form "ZERO" TO "NINE". Another example may be {$WAYPOINT_CODE} that could be expanded to "{$LETTER} {$DIGIT} {$DIGIT}".

This command expansion has an important limitation. There are several cases where it is not possible to expand all the possible values (letters or digits). For example if we would want to expand all possible values for a waypoint (considering it would be composed of latitude digit digit degrees digit digit minutes digit digit seconds plus longitude digit digit digit degrees digit digit minutes digit digit seconds) considering all possible "digit" values, there are 10×10×10×10×10× 10×2×10×10×10×10×10×10=2×10$^{11}$ possibilities. In order to avoid this situation, two word classes have been considered: letter and digit, training a class-based language model (LM).

Next in the method of FIG. 3, the class-based LM training module 42 generates a class 2-gram LM by computing the probabilities of any word/class followed by any word/class, considering the command partially expanded in the previous step. In our case, there are two word classes: "letter" (with all the possible letters), and "digit" (with all possible digits). During this process, smoothing is applied for providing some probability to sequences of words/classes not seen in the expanded commands using an expanded command list database 44. This smoothing can be controlled and adjusted for this task.

In the last step, the class expansion module 46 converts the class LM into a word LM. This process is carried out by replacing the estimated probabilities for any class ("digit, for example) by the probabilities for the words belonging to this class ("zero, one, two, . . . "). The word probabilities are computed considering the class probabilities (obtained in the previous step) and the total number of words belonging to this class, with reference to a word classes database 48. At the end of the method, the word-based 2-gram word LM is saved in the language model database 36 as the one that can be directly used by the speech recognition module 26.

The natural language understanding module 28 is responsible for the extraction of the semantic information or "meaning" (inside the specific application domain) from the speech recognition module 26 output (sequence of words). The semantic information is conveyed by a frame containing semantic concepts. A semantic concept consists of an identifier and a value. For example, the concept VELOCITY has "VELOCITY" as an identifier/attribute while a possible value is "140 knots". In this embodiment, thirty-three main concepts have been identified; twenty-two commands and the corresponding data associated with them. Internally, the natural language understanding module 28 manages other intermediate concepts that carry the semantic information when it is developed from the input (exclusively composed of words) through intermediate representations with a mixture of words and concepts (both internal and main concepts).

The natural language understanding module 28 has been implemented using a rule-based technique considering a bottom-up strategy. In this case, the relations between semantic concepts and word and/or concept sequences are defined by hand employing an expert. In a bottom-up strategy, the semantic analysis is performed starting from each word individually and extending the analysis to neighbourhood context words or already-formed concepts. This extension is done to find specific combinations of words and/or concepts that generate another concept. Not all the words contribute (or with other wording, need to be present) to the formation of the final interpretation. The rules implemented by the expert define these relations and are stored in a semantic rules database 50. This strategy is more robust against speech recognition errors and is frequently preferred when a statistical language model is used in speech recognition. Depending on the scope of the word relations defined by the rules, it is possible to achieve different compromises between reliability of the concept extracted (higher with higher lengths) and the robustness against recognition errors (higher with smaller lengths).

Figure 4:
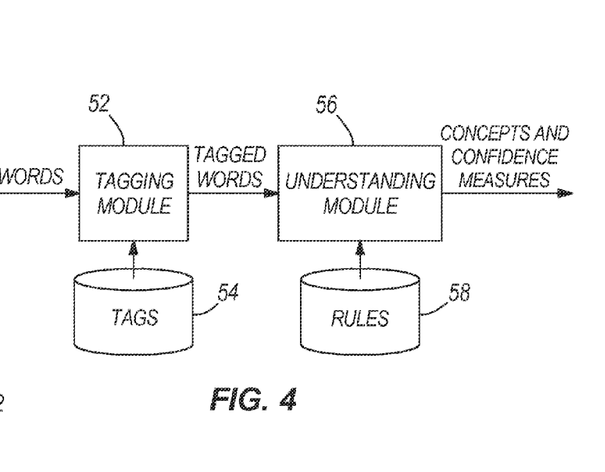
FIG. 4 is a schematic representation of a method employed by the natural language understanding module of FIG. 2.

The understanding process is carried out in two steps, as shown in FIG. 4. First, the tagging module 52 maps every word to one of several syntactic-pragmatic tags using a tags database 54. For example: ZERO, ONE, TWO, . . . are assigned the "DIGIT" tag (and ALPHA, BRAVO, CHARLIE, . . . mapped to an "ALPHABET_ITEM" tag). An example of multiple tags is the words "FLIGHT PATTERN". They are tagged with the labels COMMAND13 (to establish the predefined flight pattern) and COMMAND14 (to establish a specific flight pattern), later on through the understanding process and depending on the data detected, only one of these tags is selected.

Next, the understanding module 50 works by applying different rules stored in a rules database 58. When implemented by the understanding module 56, these rules convert the tagged words into semantic concepts and values by means of grouping words (or concepts) and defining name concepts. In order to illustrate the process, consider an example of detecting MISSION_CODE, PATTERN_CODE and WAYPOINT_CODE. These three concepts have the same value structure letter-digit-digit. There is a rule that detects these patterns in the word sequence and replaces them by an internal concept GENERAL_CODE with a code value developed through the concatenation of the blocks with the specified tags. This new GENERAL_CODE tag is used at this level where it is necessary for more information to determine fully the actual nature of this value. For example, "bravo zero three" is converted to the more convenient "B04", and the GENERAL_CODE is renamed depending on the code detected. "B04" may correspond to a mission code, in which case GENERAL_CODE becomes MISSION_CODE.

As mentioned, the natural language understanding module 28 generates a semantic confidence value for every concept identified. The values vary between 0.0 (lowest confidence) and 1.0 (highest confidence). This confidence value is computed by an internal procedure that is coded inside the proprietary language interpreter that executes each rule.

In this internal engine, there are "primitive functions" responsible for the execution of the rules written by the experts. Each primitive has its own way to generate the confidence for the elements it produces. One common case is for the primitives that check for the existence of a sequence of semantic blocks to generate some new ones, where the primitive usually assigns to the newly created blocks the average confidence of the blocks upon which it has relied.

For example, the confidence measure of the concept GENERAL_CODE described above is the average of the word confidence values for "BRAVO", "ZERO" and "THREE". After that, MISSION_CODE will have the same confidence value as the GENERAL_CODE concept. In other more complex cases, the confidence for the new blocks may be dependent on a combination of confidences from a mixture of words and/or internal or final concepts.

In critical applications like UAV control interfaces, it is very important to achieve a high level of performance but it is also very useful to have a confidence measure providing information about the reliability of the semantic information obtained. These measures avoid executing UAV actions with possibly misunderstood information, augmenting the reliability of the whole system 24.

In this embodiment, the response generation module 30 uses response templates stored in a response frames database 60 to create a natural language sentence as confirmation of the command understood. In this embodiment, the response templates 60 are variable and depend on the semantic concept confidences, on the UAV urgency and on the confirmation verbosity. In the response generation module 30, three kinds of response templates 60 corresponding to three levels of verbosity have been defined.

For "long", the system generates the longest sentences that include all the information understood.

For "short", the sentence is shortened and part of the information is omitted. The larger and more tedious parts are omitted, i.e. those for which the speech interfaces are worst justified, like full specified longitudes or latitudes that could be better confirmed in a textual or graphical form.

For "v short", the system only asserts the command understanding, without any specification about what is actually understood.

The actual level of verbosity is modulated through the specification of two parameters, urgency system status and desired confirmation verbosity. A higher level of urgency implies less verbosity on its own, while a higher level of confirmation verbosity increases the size of the response. There are three levels of urgency status (high, medium and low) and three levels of confirmation verbosity (high, medium and low). The table below shows the mapping between their corresponding settings and the global system verbosity.

|  |  | URGENCY | | |
| --- | --- | --- | --- | --- |
|  |  | low | medium | high |
| VERBOSITY | low | short | v short | v short |
|  | medium | long | short | v short |
|  | high | long | long | short |

Besides the level of verbosity, the action performed by the UAV and the actual contents of the response will depend on the understanding confidence obtained for the current utterance, as compared to a confidence threshold.

Additionally, when the understanding confidence is higher than the confidence threshold, the system provides different output depending on the command structure (if the command contains the correct data for executing it or not). The table below shows output content examples for the three lengths of response depending on the understanding confidence and the command data completeness.

|  |  | Above threshold | below threshold and incorrect | below threshold and correct |
| --- | --- | --- | --- | --- |
| LENGTH OF RESPONSE | long | Actuating mission 01 | Command C2, activate command but data not understood | Sorry, command not understood. Please repeat |
|  | short | Mission 01 | Incomplete command, not executed | Sorry, command not understood |
|  | v short | OK | Not understood | Not understood |

The natural language sentence provided by the response generation module 30 is converted into speech by means of a speech synthesis module 62. This module 32 uses a diaphone units concatenating algorithm, being able to modify the speaking rate and speaker pitch. The speaking rate and the speaker pitch has been adjusted for each length of response defined as follows.

For long responses, the default values are 180 syllable/minute (speaking rate) and approximately 130 Hz (speaker pitch).

For short responses, the speaking rate is increased by 10% and pitch is also increased by 10% to generate a faster and more dynamic voice.

For v short responses, the speaking rate is augmented by 25% and the pitch increased by 20% from the default values.

Turning now to the actual control of the UAV, command generation module 32 receives the semantic concepts and semantic confidence measures from the natural language understanding module 28. Provided the confidence measures exceed a threshold, the command generation module 32 converts the semantic concepts to command code. This command code corresponds to the instructions to be provided to the flight management system of the UAV to cause it to fly as desired. The command code is provided to a transmitter 64 that transmits the code for reception by the UAV.

Figure 5:
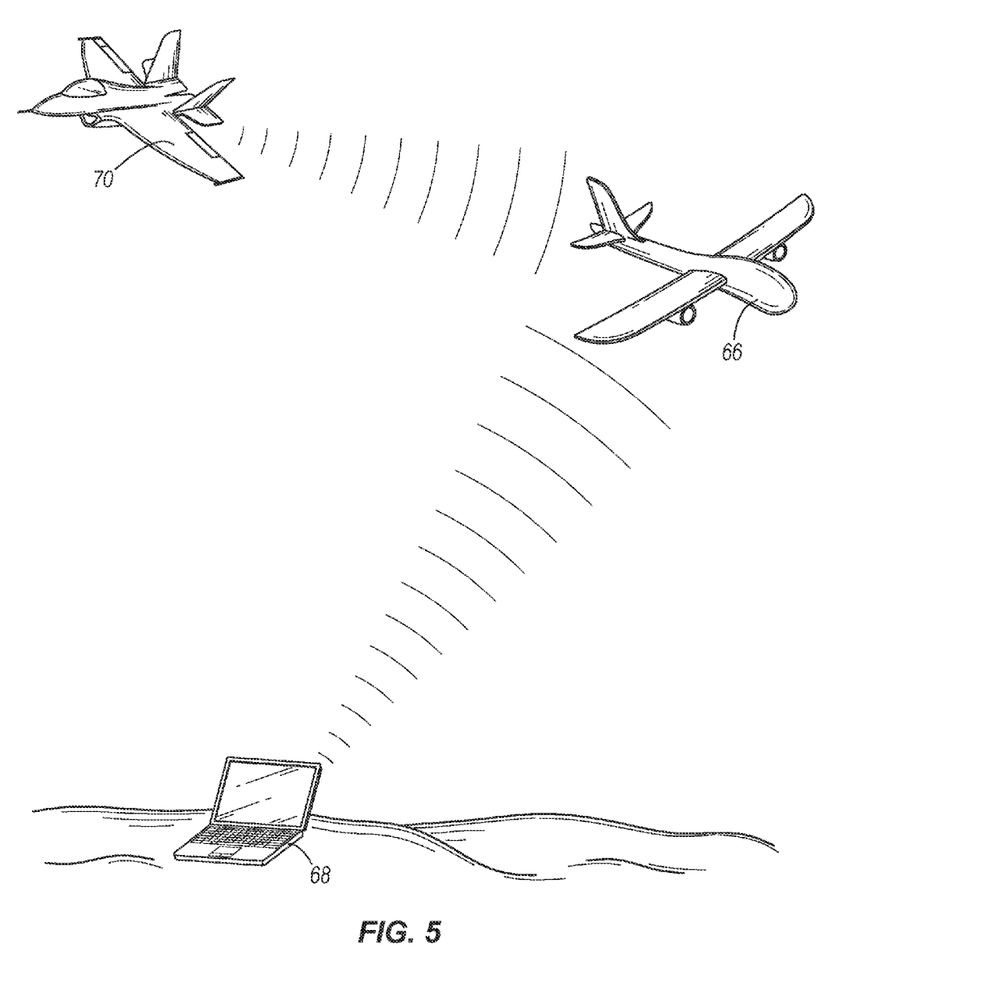
FIG. 5 is a sketch showing remote control of a UAV from both air-based and ground-based platforms.

The UAV 66 may be controlled remotely from a variety of different platforms. FIG. 5 shows two such examples. A laptop computer 68 is shown at a ground station that transmits command codes to the UAV 60. The communication link may be bi-directional, i.e. the UAV 66 may transmit messages back to the ground station 68, e.g. to acknowledge receipt of commands. A second, air-based platform 70 is showing FIG. 5. Here, a weapons officer on an airplane 70 uses a suitably programmed computer to control the UAV 66.

Again, this communication link may be bi-directional, as for the ground station link. Hence, the two aircraft may fly missions together, for example with the UAV 66 flying a reconnaissance role to locate targets that are then engaged by the manned airplane 70. Of course, both air-based 70 and ground-based platforms 68 may be used together.

The person skilled in the art will appreciate that variations may be made to the embodiment described above without departing from the scope of the invention defined by the appended claims.

The invention claimed is:

1. A computer-implemented method of controlling a vehicle, comprising:
   receiving one or more instructions issued as speech;
   analyzing the speech using speech recognition software to provide a sequence of words and a word confidence measure for each word so recognized;

analyzing the sequence of words to identify a semantic concept corresponding to an instruction based on the analysis, and a semantic confidence level for the identified semantic concept derived at least in part with reference to the word confidence measures of the words associated with the semantic concept;

providing a spoken confirmation of the semantic concept so identified based on the semantic confidence level and an indicated verbosity level, the spoken confirmation being provided with one of a speaking rate or a pitch that is increased as the indicated verbosity level decreases; and using the semantic concept so identified to provide a control input for the vehicle;

wherein the step of providing the spoken confirmation of the semantic concept comprises indicating that the instruction was not understood when the semantic confidence level is below a threshold, or the step of using the semantic concept comprises providing the control input for the vehicle when the semantic confidence level exceeds the threshold.

2. The method of claim 1, wherein the step of analyzing the speech to provide a sequence of words comprises using continuous hidden Markov models.

3. The method of claim 1, wherein the step of analyzing the speech to provide a sequence of words comprises using a language model that provides information about the most likely sequences of words expected to be found.

4. The method of claim 3, wherein the step of analyzing the speech to provide a sequence of words comprises using the language 30 model to provide a 2-gram statistical model.

5. The method of claim 1, wherein the step of analyzing the sequence of words comprises analyzing the sequence of words and the associated word confidence measures to identify the semantic concept.

6. The method of claim 5, wherein the semantic concept comprises an identifier and a value.

7. The method of claim 5, wherein the step of analyzing the sequence of words comprises:
identifying the semantic concept using a bottom-up approach starting with an analysis of each word identified individually and then extending the analysis to neighboring words.

8. The method of claim 5, wherein the step of analyzing the sequence of words to identify the semantic concept comprises:
tagging each word according to its type, and looking for known patterns from the sequence of tags, thereby allowing deduction of the semantic concept.

9. The method of claim 1, further comprising:
providing the spoken confirmation of the identified semantic concept based on the semantic confidence level and an urgency level, the verbosity of the spoken confirmation decreasing with increasing urgency level.

10. The method of claim 9, wherein the providing the spoken confirmation step comprises providing the spoken confirmation of the identified semantic concept with at least one of the speaking rate or the pitch that is increased as the urgency level increases.

11. An apparatus for controlling a vehicle, comprising:
an input arranged to receive one or more instructions issued as speech;
a memory arranged to store the received speech;
a speech recognition module arranged to analyze the speech to provide a sequence of words and a word confidence measure for each word recognized;

a natural language understanding module arranged to receive the sequence of words and the word confidence measures, and analyze the sequence of words to identify a semantic concept corresponding to an instruction based on the analysis and a semantic confidence level for the identified semantic concept derived at least in part with reference to the word confidence measures of the words associated with the semantic concept;

a response generation module arranged to provide a spoken confirmation of the identified semantic concept based on the semantic confidence level and an indicated verbosity level; and a command generation module arranged to use the identified semantic concept to provide a control input for the vehicle;

wherein the response generation module is arranged to provide the spoken confirmation of the identified semantic concept to indicate that the instruction was not understood when the semantic confidence level is below a threshold, or the command generation module is arranged to use the identified semantic concept to provide a control input for the vehicle when the semantic confidence level exceeds the threshold, and the response generation module is arranged to provide the spoken confirmation of the identified semantic concept with at least one of a speaking rate or a pitch that is increased as the indicated verbosity level decreases.

12. The apparatus of claim 11, further comprising an acoustic model database operably coupled to the speech recognition module, wherein the acoustic model database has hidden Markov models stored therein, and additionally has optionally continuous hidden Markov models stored therein.

13. The apparatus of claim 11, further comprising a language model database operably coupled to the speech recognition module, wherein the language model database has data stored therein that provides information about the most likely sequences of words expected to be found.

14. The apparatus of claim 13, wherein the language model database has a 2-gram statistical model stored therein.

15. The apparatus of claim 11, wherein the natural language understanding module is arranged to analyze the sequence of words and the associated word confidence measures to identify the semantic concept.

16. The apparatus of claim 11, wherein the natural language understanding module is arranged to provide the semantic concept as an identifier and a value.

17. The apparatus of claim 11, wherein the natural language understanding module is arranged to analyze the sequence of words to identify the semantic concept using a bottom-up approach starting with an analysis of each word identified individually and then extending the analysis to neighboring words.

18. The apparatus of claim 11, wherein the natural language understanding module is arranged to analyze the sequence of words to identify the semantic concept by tagging each word according to at least one of its type, command, digit, or letter, and to look for known patterns from the sequence of tags, thereby allowing deduction of the semantic concept.

19. The apparatus of claim 11, wherein the response generation module is arranged to provide the spoken confirmation of the identified semantic concept based on the semantic confidence level and an urgency level, the verbosity of the spoken confirmation decreasing with increasing urgency level.

20. The apparatus of claim 19, wherein the response generation module is arranged to provide the spoken confirmation of the identified semantic concept with at least one of a speaking rate or a pitch that is increased as the urgency level increases.

21. The apparatus of claim 11, wherein the response generation module has associated with it a database containing response templates for use in constructing the spoken confirmation.

22. A computer-implemented method of controlling a vehicle, comprising:

receiving one or more instructions issued as speech;

analyzing the speech using speech recognition software to provide a sequence of words and a word confidence measure for each word so recognized;

analyzing the sequence of words to identify a semantic concept corresponding to an instruction based on the analysis, and a semantic confidence level for the identified semantic concept derived at least in part with reference to the word confidence measures of the words associated with the semantic concept;

providing a spoken confirmation of the semantic concept so identified based on the semantic confidence level, the spoken confirmation having one of a speaking rate or a pitch adjusted according to an indicated response length; and using the semantic concept so identified to provide a control input for the vehicle;

wherein the step of providing the spoken confirmation of the semantic concept comprises indicating that the instruction was not understood when the semantic confidence level is below a threshold, or the step of using the semantic concept comprises providing the control input for the vehicle when the semantic confidence level exceeds the threshold.

23. The method of claim 22, wherein the step of analyzing the speech to provide a sequence of words comprises using continuous hidden Markov models.

24. The method of claim 22, wherein the step of analyzing the speech to provide a sequence of words comprises using a language model that provides information about the most likely sequences of words expected to be found.

25. The method of claim 22, wherein the step of analyzing the speech to provide a sequence of words comprises using the language 30 model to provide a 2-gram statistical model.

* * * * *